May 20, 1924.
J. V. WELLS
FAUCET
Filed Oct. 31, 1922
1,494,395
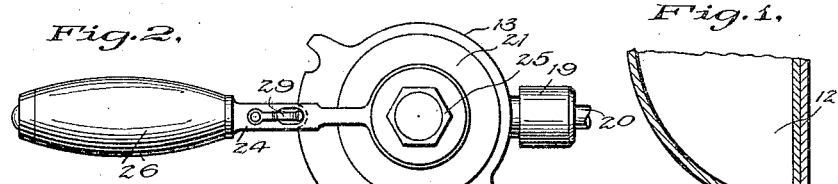
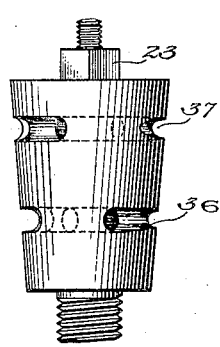
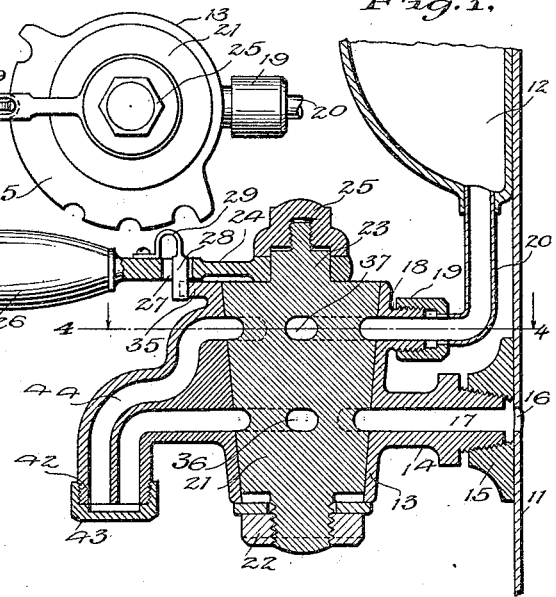
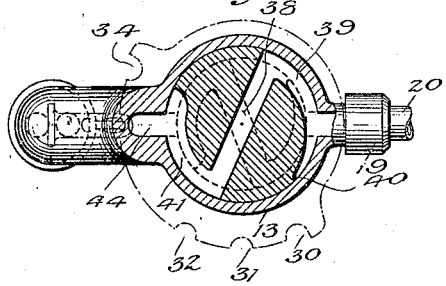
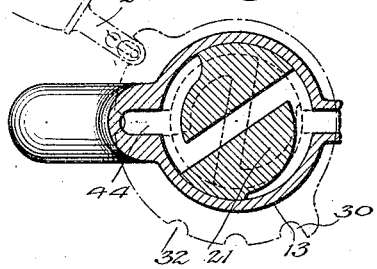
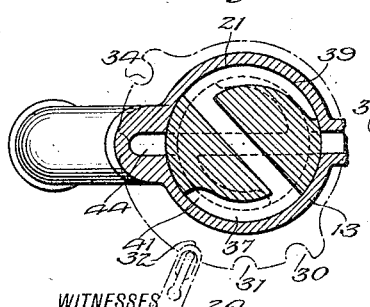
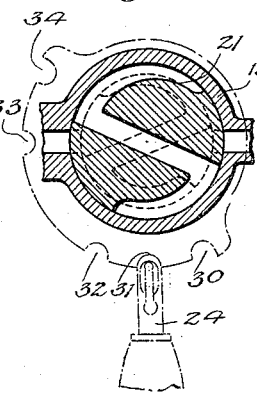
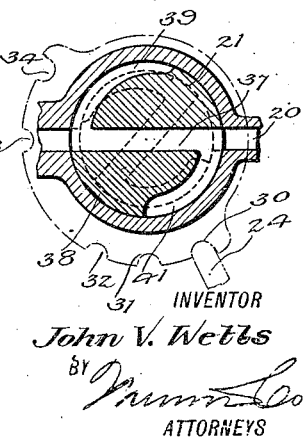
WITNESSES
E. A. Wilson
G. L. Kitchin
INVENTOR
John V. Wells
BY
ATTORNEYS Patented May 20, 1924.

1,494,395

UNITED STATES PATENT OFFICE.

JOHN V. WELLS, OF NEW YORK, N. Y., ASSIGNOR OF ONE-HALF TO LOUIS X. GARFUNKEL, OF NEW YORK, N. Y.

FAUCET.

Application filed October 31, 1922. Serial No. 598,163.

*To all whom it may concern:*

Be it known that I, JOHN V. WELLS, a citizen of the United States, and a resident of the city of New York, borough of Manhattan, in the county and State of New York, have invented a new and Improved Faucet, of which the following is a full, clear, and exact description.

This invention relates to faucets for coffee urns or other dispensing receptacles and has for an object to provide an improved construction wherein coffee and milk are dispensed simultaneously and in certain definite proportions.

Another object of the invention is to provide a faucet for coffee urns and the like wherein not only is the coffee and milk dispensed but discharged in any desired proportion.

A further object, more specifically, is to provide a faucet for coffee urns for dispensing coffee and milk simultaneously in certain definite proportions and dispensing them in such a way that the coffee and milk will not mix until after they have left the faucet.

A still further object of the invention is to provide a dispensing faucet for coffee urns arranged with a cap and associated connecting members whereby steam from the coffee urn may be forced through the key of the faucet and into the milk dispensing chamber for cleaning and sterilizing purposes.

In the accompanying drawing—

Figure 1 is a longitudinal vertical section through a faucet disclosing an embodiment of the invention, the same being shown as applied to coffee and milk containers.

Figure 2 is a top plan view of the faucet shown in Figure 1.

Figure 3 is an elevation of the key or plug shown in Figure 1.

Figure 4 is a sectional view through Figure 1 approximately on line 4—4.

Figure 5 is a view similar to Figure 4 but showing the key in a different position.

Figure 6 is a view similar to Figure 4 but showing the key in a different position whereby milk only may be discharged.

Figure 7 is a view similar to Figure 4 but showing the faucet closed.

Figure 8 is a view similar to Figure 7 but showing the key in position for discharging coffee only.

Referring to the accompanying drawing by numerals, 11 indicates a container of any desired kind for containing coffee ordinarily which is to be dispensed. Preferably, adjacent the container 11 is a second container 12 containing milk adapted to be dispensed at the same time as the coffee in the container 11. A suitable dispensing faucet is connected to these two containers which is provided with a casing 13 having an extension 14 designed to be screwed into a hollow reinforcing internally threaded member 15 secured to the container 11 opposite the opening 16 whereby coffee may freely flow through the passage-way 17 towards the interior of the casing 13. At a short distance above the extension 14 is a second hollow extension 18 externally threaded for receiving the sleeve or coupling 19 which is connected with a suitable pipe 20, said pipe in turn being connected with the lower part of the auxiliary container 12 whereby milk may freely flow into the casing 13. The casing 13 is provided with a desired taper for receiving the valve plug or key 21, which key is provided with the usual taper and is locked in place by a suitable nut 22 at the bottom while the top is provided with a squared extension 23 for projecting through the squared opening in the handle 24, said handle being held in place by a suitable nut 25. A grip 26 is secured to the outer end of handle 24 whereby the handle may be swung back and forth. A slot 27 is formed in the handle 24, said slot accommodating the catch 28 depending from the spring 29, which spring is rigidly secured to the handle 24 in any suitable manner, as for instance, by a screw.

Preferably, the catch 28 and the spring 29 are made of one piece. The catch 28 is adapted to snap into any of the depressions or notches 30, 31, 32, 33 and 34 of a flange 35 upstanding from the top of the casing 13. The notches 30 to 34 inclusive, are positioned in a certain definite relationship to the passage-ways in the key 21. The key 21 is provided with a coffee passage-way 36 and a milk passage-way 37, each of said passage-ways being substantially Z-shaped as indicated in Figures 4 to 8. Each of these passage-ways is provided with a central section 38 extending entirely through the key centrally thereof and merging at one end into an arc-shaped lateral passage-way 39 tapering from the section 38 to the end 40 while at the opposite end the section 38 is provided with an arc-shaped section or passage-way 41 of the same width throughout. Both of the passage-ways 36 and 37 are of the same structure but are set at different angles so that the section 38 of one passage-way will be at a decided angle to the other as indicated in dotted lines in Figures 4 to 8.

By this construction and arrangement, whenever the handle 24 is in the position shown in Figure 7, the faucet is closed and neither coffee nor milk can pass therefrom. When the handle is turned over until it assumes the dotted position shown in Figure 8, milk is dispensed but not coffee, said milk passing from the pipe 20 through the passage-way 37 and from thence out the discharge end 42. If the handle 24 is shifted to the notch 32 as indicated in Figure 6, coffee will freely flow through the faucet but the milk is shut off. When the handle 24 is shifted until it is opposite the notch 33 as shown in Figure 4, half coffee and half milk will be discharged from the faucet. If the handle 24 is again shifted until it occupies the position shown in dotted lines in Figure 5, a large amount of milk will be discharged in proportion to the coffee. It will be noted that by reason of the tapering construction of passage-ways 39, the operator may gradually vary either the amount of coffee or milk discharged to give a large proportion of either coffee or milk in a given quantity discharged. When the coffee or milk is being discharged, the cap 43 is unscrewed from the discharge end 42. After the containers 11 and 12 and the faucet have been in use for some time, it is desirable that not only the two containers be cleaned and sterilized but also the faucet. To do this, the container 11 is supplied with a quantity of steam or hot water in any suitable manner and cap 43 is placed in position as shown in Figure 1. The handle 24 is then turned until it occupies the position shown in Figure 4 whereupon steam may freely pass to the discharge end 42 and then in a reverse direction through the passage-way 44 to passageway 37 and into the milk container 12 for cleaning and sterilizing this container as well as cleaning and sterilizing the faucet. After water and steam have been passed in this direction, the container 11 may be opened to the atmosphere by moving handle 26 to the position shown in Figure 4, cap 43 removed whereby the chambers 11 and 12 will be drained through the faucet of all cleanser. This action may be repeated as often as desired to secure a proper cleaning and sterilizing action. After the parts have been properly cleaned and sterilized, handle 24 is moved to the closed position shown in Figure 7 and then coffee and milk are supplied to the respective containers and the device is ready for use once more.

What I claim is:—

1. A faucet of the character described, comprising a casing provided with a coffee passage-way and a milk passage-way, a key arranged in said casing provided with a coffee passage-way and a milk passage-way, means for rotating said key to bring the respective passage-ways into and out of registry, and means for connecting the outlet sections of the passage-ways in the casing so that the milk and coffee passage-ways will be in communication.

2. In a faucet of the character described, a key provided with two passage-ways arranged at different points in the key, each of said passage-ways being substantially Z-shaped, the arms of the respective passage-ways extending in opposite directions and overlapping to an appreciable extent.

3. In a faucet of the character described, a key provided with two independent passage-ways, each passage-way being Z-shaped and one arm of each passage-way tapering from one end to the other, the tapering arms of the respective passage-ways being on the same side of the key, the arms of the respective passage-ways extending in the opposite directions and overlapping.

4. A faucet of the character described, comprising a casing provided with coffee and milk passage-ways, a key provided with coffee and milk passage-ways, each of said passage-ways being formed substantially Z-shape with one arm tapering from one end to the other, the tapering arms of the respective passage-ways tapering in opposite directions whereby as the key is turned the amount of coffee and milk will be varied.

5. A faucet of the character described, comprising a casing having coffee and milk passage-ways therethrough, a key arranged in said casing provided with substantially Z-shaped passage-ways for the coffee and for the milk, said casing being provided with a flange having a plurality of notches therein, there being one notch for each position of the passage-ways in the key in respect to the passage-ways in the casing, a handle for turning said key, and resilient means carried by the handle adapted to snap into said notches.

6. In a faucet of the character described, a casing provided with a plurality of passage-ways extending therethrough, a key positioned in said casing and provided with a passage-way for each of the first mentioned passage-ways, a handle for rotating said key, said handle having a slot therein, a catch extending through said slot provided with spring means for resiliently holding the same in a given position, means for connecting said spring means with said handle, and means extending from the casing having spaced notches adapted to receive said catch at different times to hold the key in certain relative positions in respect to the passage-ways in the casing.

JOHN V. WELLS.